Aug. 12, 1969   E. E. CRIST ET AL   3,460,511
PLASTIC COATING APPLICATOR FOR CORRUGATED CARDBOARD
Filed Oct. 5, 1967   4 Sheets-Sheet 1

LYMAN B. FURRY
EARL E. CRIST
  INVENTOR.

their attorney

Aug. 12, 1969  E. E. CRIST ET AL  3,460,511
PLASTIC COATING APPLICATOR FOR CORRUGATED CARDBOARD
Filed Oct. 5, 1967  4 Sheets-Sheet 4

LYMAN B. FURRY
EARL E. CRIST
            INVENTOR.

Neal A Mozely
their attorney

United States Patent Office 3,460,511
Patented Aug. 12, 1969

1

3,460,511
PLASTIC COATING APPLICATOR FOR
CORRUGATED CARDBOARD
Earl E. Crist, 806 Morris, Washington, Ill. 61571, and
Lyman B. Furry, 15 N. Alexander, Danville, Ill.
61832
Filed Oct. 5, 1967, Ser. No. 673,179
Int. Cl. B05c 1/08, 11/10
U.S. Cl. 118—69                                11 Claims

ABSTRACT OF THE DISCLOSURE

An improved hot melt plastic coating applying apparatus capable of high speed operation without waste comprises an elongated heated reservoir for a hot melt plastic coating for application to corrugated cardboard or the like, and electrically heated knurled plastic applicator wheels rotating within the reservoir. The reservoir and plastic coating applying wheel are both heated to maintain the plastic coating in a fluid condition up to the point of application to the corrugated cardboard sheet material or other sheet material being processed. The reservoir is provided with a suitable arrangement of baffles and ribs to prevent the molten plastic coating material from splashing out during high speed operation. The apparatus preferably includes a doctor blade arrangement for regulating the thickness of coating applied to the corrugated cardboard. The apparatus includes an off-take conveyor mechanism for removing coated corrugated cardboard and suspending the coated cardboard until the coating has solidified or dried. The off-take mechanism includes a system of conveyor belts and a system of fans directed to suspend the coated board against the conveyor belts with the coated surface exposed to high air velocity from the fans. This arrangement provides for rapid cooling and drying of the coating and suspends the coated corrugated board in the conveyor for removal from the coating apparatus.

Background of the invention

In the manufacture of cartons, boxes, and other containers of corrugated cardboard, there has been a substantial need for corrugated board having a completely waterproof coating. At the present, there are many manufacturers who provide corrugated board having wax coatings for water resistance but none who provide a completely waterproof board on any substantial scale. A completely waterproof corrugated board would be best prepared by coating with a hot melt plastic or a plastic lacquer which adheres well to the surface layer of the board and is thoroughly water repellent upon hardening or drying. Commercially available machines for coating paper, paperboard, corrugated cardboard, and the like, cannot operate at a high speed due to inherent limitations in the operation of the coating rollers and also due to difficulties encountered in drying the coatings or hardening the coatings rapidly enough to permit handling of the coated board.

Coating machines which are presently available use either bottom coating rollers or top coating rollers or combinations thereof for application of the desired coating to either the bottom, top, or both sides of the sheet or board being coated. The use of a bottom coating roller has generally resulted in the application of irregular coatings and has created special problems resulting from the tendency of the partially dry coating to stick to the conveyor means used to remove the coated board from the coating apparatus. Machines which use top coating rollers have the disadvantage of leakage of coating material around the coating rollers and also the tendency of the coating material to set up on the coating roller when it

2 is stopped for any period of time. Machines which use combinations of bottom coating rollers and top coating rollers have both disadvantages.

Statement of objects and features of the invention

It is, therefore, one object of this invention to provide a new and improved apparatus for application of plastic coating materials to corrugated cardboard or similar sheet stock at high speed.

Another object of this invention is to provide an improved apparatus for application of plastic coating materials to corrugated cardboard or similar flat stock and to support the coated stock with the coated surface out of contact with the conveyor means for withdrawing the stock from the coating apparatus.

Still another object of this invention is to provide a new and improved apparatus for high speed application of plastic coating materials in which the coating applicator can be operated at high speed without waste of coating material.

Still another object of this invention is to provide a new and improved apparatus for high speed application of hot melt coating materials to corrugated cardboard or similar flat stock in which the coating material is continuously maintained in a fluid condition up to the point of application to the stock being processed.

A feature of this invention is the provision of a new and improved apparatus for high speed application of plastic coating materials to corrugated cardboard or similar flat stock including coating applicator means for application of a uniform layer of a plastic coating material and including blower means for supporting the coated stock with the coated surface out of contact with the conveyor withdrawing the stock from the apparatus.

Another feature of this invention is the provision of a new and improved apparatus for high speed application of plastic coating materials including means to maintain the coating materials fluid up to the point of application to the stock being processed.

Still another feature of this invention is the provision of a new and improved apparatus for high speed application of hot melt coating materials to corrugated cardboard or similar flat stock and including a coating applicator wheel provided with improved means for preventing waste of coating material at high speed operation.

Other objects and features of this invention will become apparent from time to time throughout the specification and claims as hereinafter related.

Summary of the invention

This invention comprises an improved coating apparatus for application of plastic coatings to corrugated cardboard or similar flat stock material. The apparatus is a machine capable of very high speed operation without waste in the application of coatings and includes an off-take conveyor mechanism in which the coated stock is floated in a stream of air with the coated surface out of contact with the off-take conveyor. In this machine, there is provided a heated reservoir for a hot melt plastic coating to be applied and having electrically heated knurled plastic coating wheels (preferably with recessed knurling) rotating within the reservoir. In the apparatus, both the reservoir and coating wheels are preferably heated to maintain the coating material in a fluid condition both in the reservoir and on the applicator wheel at the point of application of the coating to the stock being processed.

The plastic coating reservoir is preferably provided with an arrangement of baffles and ribs preventing the coating material from splashing out during high speed operation. A suitable doctor blade arrangement meters the amount of coating material applied by the applicator wheel to the stock being processed. The stock, after coating, passes out into a conveyor mechanism wherein a system of vertically disposed blowers supports the coated stock in an air stream with the coated surface out of contact with the conveyor. The air stream functions to support the coated stock and to accelerate the drying or hardening of the coating while the conveyor removes it from the coating apparatus.

Brief description of the drawings

In the accompanying drawings, to be taken as a part of this specification, there is clearly and fully illustrated a preferred embodiment of this invention, in which drawings.

Description of the preferred embodiment

Figure 1:
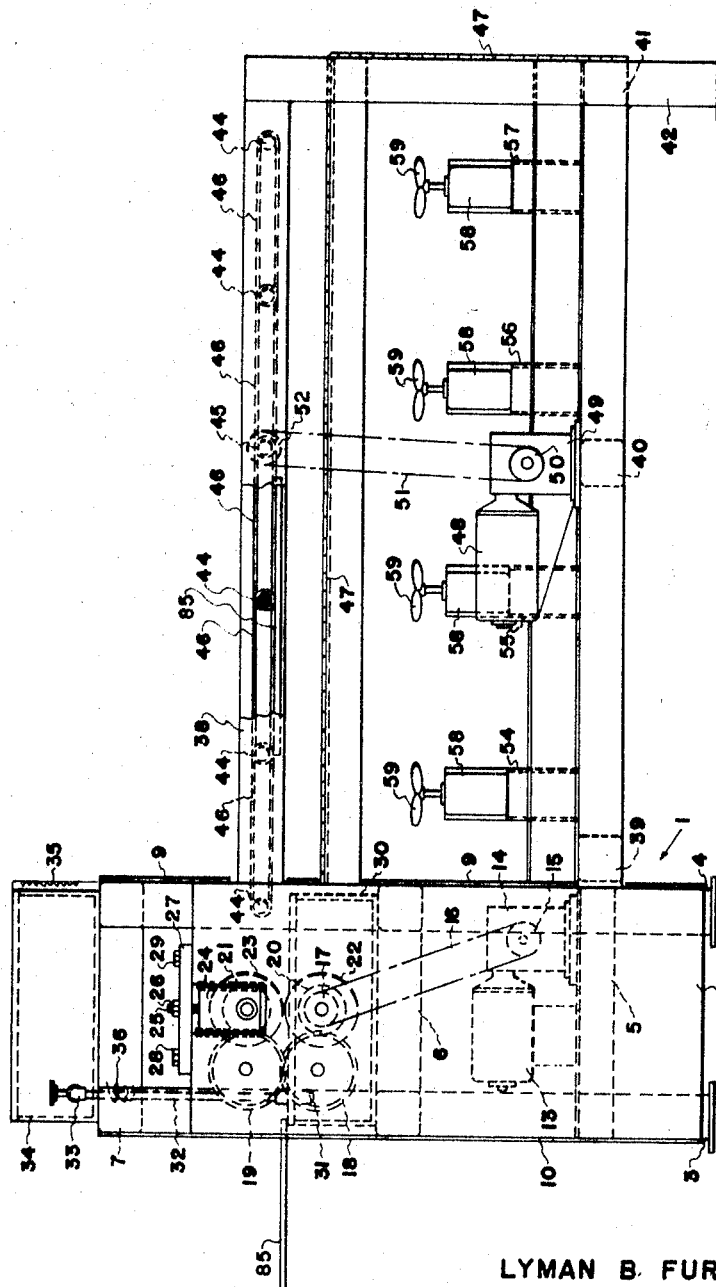
FIG. 1 is a view in elevation of the high speed plastic coating apparatus of this invention.
Figure 2:
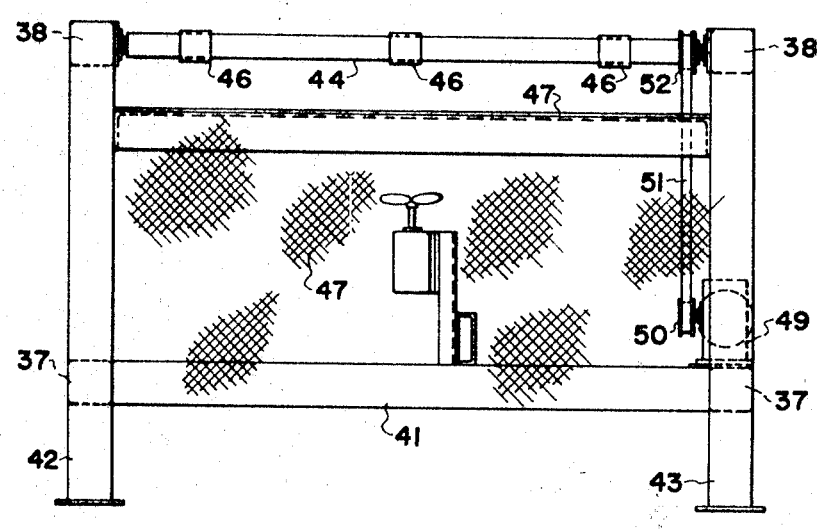
FIG. 2 is a view in right elevation of the end of the off-take conveyor of the apparatus shown in FIG. 1.
Figure 3:
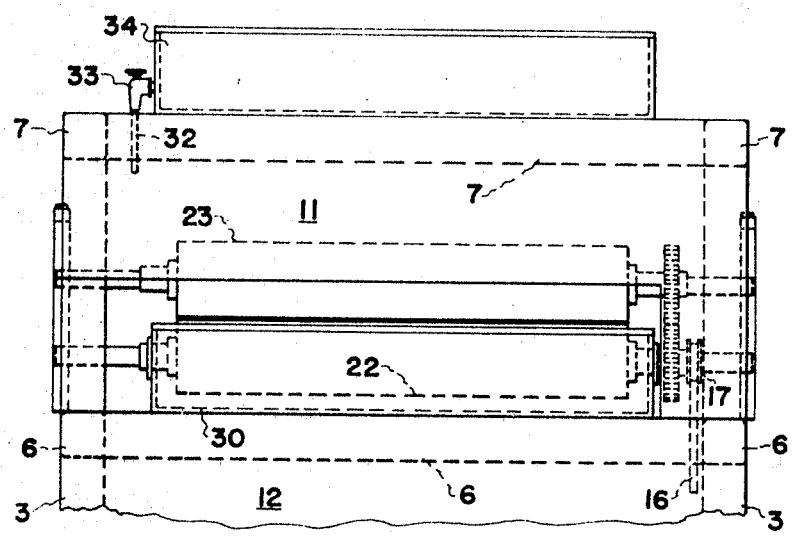
FIG. 3 is a fragmentary view in left elevation of the coating apparatus shown in FIG.. 1.

Referring to the drawings by numerals of reference and more particularly to FIGS. 1 to 3, there is shown front and side elevations of a novel apparatus 1 for high speed application of plastic coating materials, preferably hot melt coating materials, to corrugated cardboard or similar stock material. Apparatus 1 has a welded angle iron (square tubing could be substituted for angle iron) framework and is covered with heavy gauge sheet metal panels. Apparatus 1 includes vertically extending angles 3 and 4 which, together with a similar set of angles at the rear of the apparatus, provide the vertical supports for the coating portion of the apparatus. At the lower end of the apparatus, there is provided a laterally extending angle iron 5 which provides a support for the motor driving the coating rollers. At approximately the midpoint of the apparatus vertically as viewed in FIG. 1, there are provided angle irons 6 welded to angle irons 3 and 4 which provide a support for the coating liquid reservoir which will be subsequently described. At the upper end of the apparatus as seen in FIG. 1, there are provided angle irons 7 welded to angle irons 3 and 4 and providing a support for the supply reservoir for the coating material. The apparatus is provided with sheet metal wall members 8, 9, 10, 11, and 12 which enclose the drive mechanism and coating rollers. The sheet metal wall members may be bolted or welded to the framework. It is preferred, however, that at least one wall be bolted to the framework to provide access to the apparatus for repair and maintenance.

At the lower portion of the apparatus, there is provided an electric motor 13 supported on angle iron 5 and arranged to drive variable speed gear box 14. Gear box 14 includes drive pulley 15 which operates belt 16 driving gear 17 of the coating applying portion of the apparatus. Gear 17 drives gears 18 and 19 which in turn drive gears 20 and 21 which rotate coating roller 22 and press roller 23, respectively. Press roller 23 is supported on a pair of movable plates 24 at opposite ends of the apparatus. Plates 24 are adjustably supported by screw member 25 and nut 26 on supporting plate 27. Supporting plate 27 is secured in place by bolts or screw 28 and 29, respectively. The vertical adjustment of press roller 23 permits variation in the thickness of the corrugated cardboard or other sheet stock being processed.

Coating roller 22 is supported for rotation in reservoir 30 which will be described in more detail later. Reservoir 30 has an inlet connection 31 connected to conduit 32 leading to outlet connection 33 on supply reservoir 34. The arrangement of angle irons 7 at the top of the apparatus provides the support on which supply reservoir 34 is located. Supply reservoir 34 is provided with a plurality of electric heaters 35 for maintaining the contents of the reservoir fluid. Likewise, conduit or tube 32 is provided with an electric heater, indicated diagrammatically as a heating coil 36, for maintaining the contents of the conduit fluid for supply to reservoir 30.

At the right side of the apparatus shown in FIG. 1, there is provided an off-take conveyor mechanism for removing the coated stock from the coating apparatus and protecting it until the coating has dried or hardened. The conveyor portion of the apparatus includes a plurality of supporting angle iron members (square tubing could also be used) 37 and 38 extending laterally as viewed in FIG. 1. There is also provided a plurality of angle iron members 39, 40, and 41 extending from front to back as viewed in FIG. 1. Supporting angle iron members 42 and 43 support the ends of members 37 and 38 and complete the supporting framework for the conveyor section.

Figure 8:
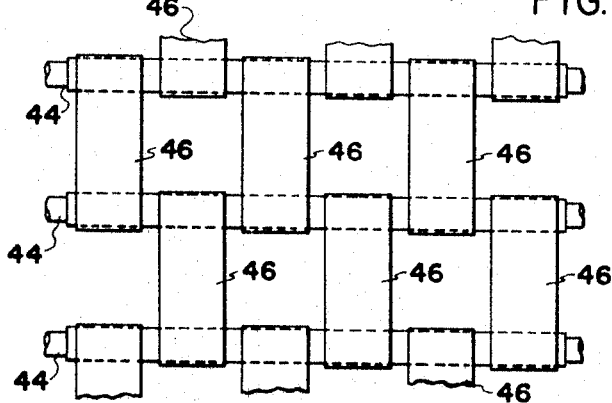
FIG. 8 is a detail fragmentary view of a portion of the conveyor belt system for removing coated stock from the apparatus.

At the upper end of the conveyor portion of the apparatus, there are provided a plurality of rollers 44 and a drive roller 45 on which there are mounted conveyor belts 46 (seen in more detail in FIG. 8). Just beneath the conveyor belts 46 there is positioned a continuous coarse mesh screen 47 which extends longitudinally of the conveyor section and vertically at the right end of the conveyor section.

On angles 37 and 40 at the lower end of the conveyor portion, there is supported electric motor 48 which drives an adjustable gear box 49. Gear box 49 is provided with pulley 50 on which there is mounted belt 51 which drives pulley 52 on drive roller 45. Electric motor 48 is, therefore, operable to rotate drive roll 45 and, operating through pulleys or belts 46, moves the entire system of belts to provide a continuously moving conveyor surface.

The lower portion of the conveyor apparatus also includes supporting channel member 53 on which there are supported vertically extending support members 54, 55, 56, and 57. On the support members 54, 55, 56, and 57, there are supported electric motors 58 driving fans 59. The plurality of fans 59 are operable to supply an upward current of air through screen 47 at a velocity sufficient to support the coated corrugated cardboard or other sheet stock against the moving conveyor belts 46. The velocity of air from fans 59 is sufficient to perform the dual function of supporting the coated stock against conveyor belts 46, with the coated surface positioned downward away from the conveyor belts, and to cool and harden the coating on the coated stock prior to its ejection at the right end of the apparatus as seen in FIG. 1.

Figure 5:
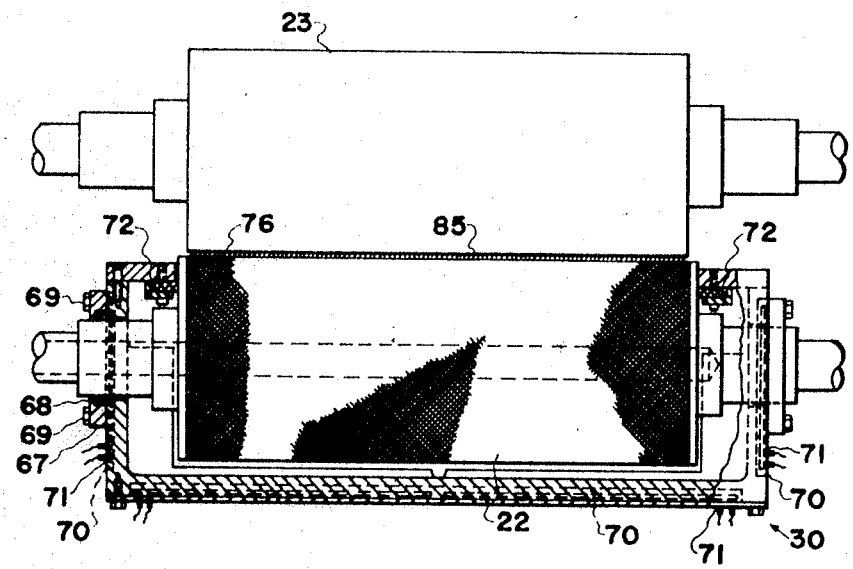
FIG. 5 is a broken sectional view of the reservoir for the plastic coating material and showing the relationship of the coating wheel and the press wheel.
Figure 6:
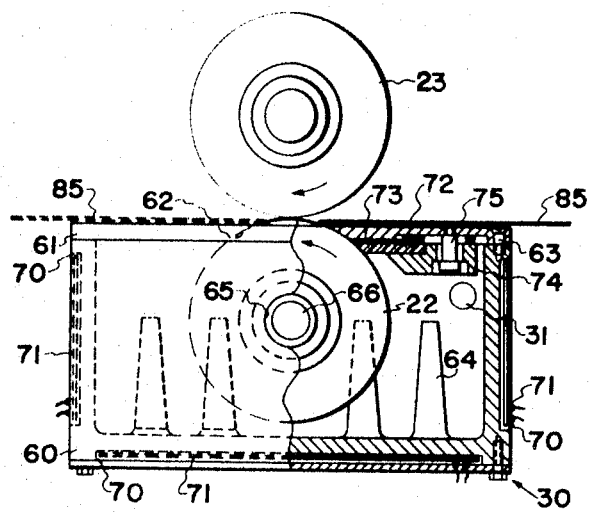
FIG. 6 is a view partially in section and partially in side elevation of the coating reservoir and coating wheel and press wheel shown in FIG. 5.

The details of the coating roller, press roller, and plastic coating material reservoir and associated apparatus are brought out more clearly in FIGS. 4 to 7 of the drawings. In FIG. 6, the reservoir 30 is shown as comprising a rectangular pot portion 60 having a lid 61 with a slot 62 through which the upper portion of coating roller 22 extends. Lid 61 is secured on reservoir 30 by a plurality of bolts or screws 63. Reservoir 30 is provided with a plurality of ribs 64 extending across the open reservoir and having a portion cut out to receive coating rmoller 22. This relationship of roller 22 and ribs 64 is seen more clearly in FIG. 4. Reservoir 30 is also provided with a side aperture 65 through which shaft 66 extends supporting roller 22. A metal sealing ring 67 and plastic gasket 68 are secured to the side of reservoir 30 by a plurality of bolts 69. Ring 67 and gasket 68 seal opening 65 against leakage of the fluid or molten plastic coating material from the reservoir 30.

Plastic coating material reservoir 30 is provided with a plurality of recesses 70 in which there are positioned electric heaters 71 for heating the walls of the reservoir. The electric heaters 71 are operable to maintain the temperature of reservoir 30 sufficient to maintain a molten thermoplastic coating material in a fluid condition or to maintain a thermoplastic lacquer at a lower viscosity for application to the stock being coated. The arrangement of electric heaters 71 in recesses 70 is essentially duplicated in the electric heater arrangement 35 used for heating reservoir 34 to maintain the contents fluid.

In FIG. 6, it is seen that cover 61 has a plastic gasket 72 which is preferably of a heat resistant thermoplastic material such as polytetrafluoroethylene (Teflon) positioned to engage the surface and sides of coating roller 22. Engagement of gasket 72 with the surface of roller 22 is seen in FIG. 6 while the engagement of the gasket with the sides of the coating roller is seen in FIG. 5. Teflon gasket 72 is pressed against the surface of coating roller 22 by metal spring 73 which also dresses the roller for an accurate coating of plastic material. Spring 73 and gasket 72 are secured in place by bracket 74 and screws 75.

Figure 4:
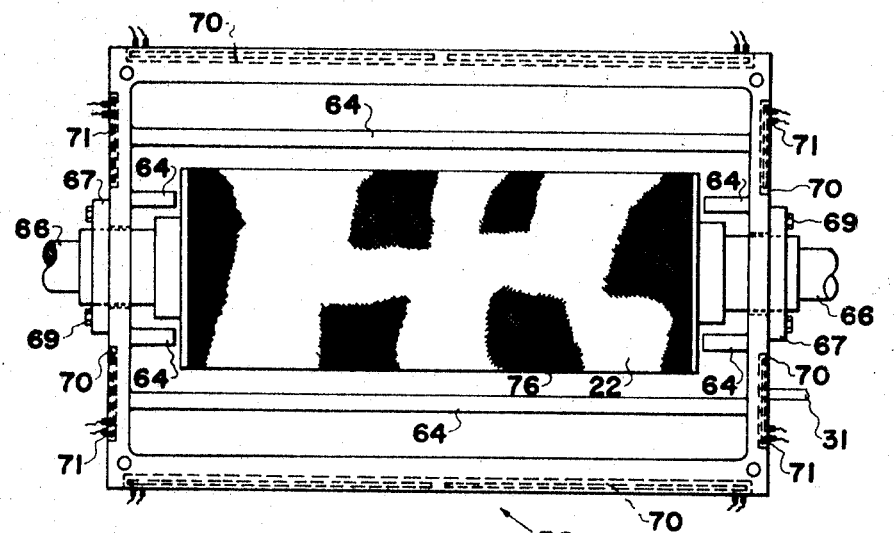
FIG. 4 is a plan view, with cover removed, of the reservoir and coating wheel for the plastic coating composition.
Figure 7:
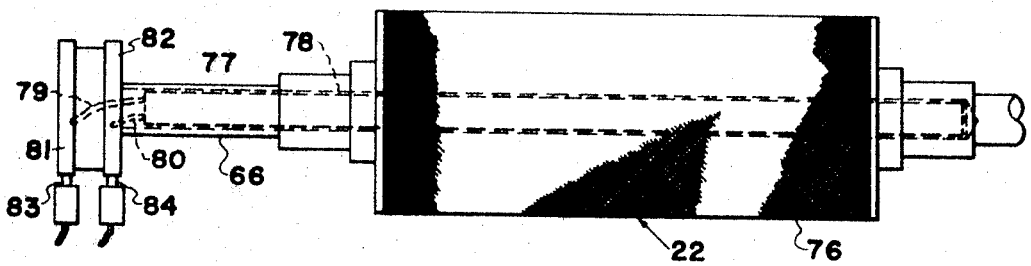
FIG. 7 is a detail view of the knurled plastic applicator wheel which is shown in the plastic coating material reservoir in FIGS. 5 and 6.

Coating roller 22 is seen in more detail in FIGS. 4, 5, and 7. Coating roller 22 has a coarsely knurled surface 76 which is formed of knurls having depth and spacing averaging from about 0.002–0.010 in. which facilitates picking up the fluid plastic coating material from the reservoir for application to the corrugated cardboard or other stock being processed. Shaft 66 for coating roller 22 is hollow as indicated at 77 and has a thermostatically controlled heater 78 positioned therein to maintain coating roller 22 at a temperature such that a molten hot melt thermoplastic coating material will be maintained fluid on the surface of the coating roller up to the point of contact with the stock being processed. Heater 78 is connected by lead wires 79 and 80 to collector rings 81 and 82 which are engaged by electrical brushes 83 and 84 for connection to a source of electric power (not shown).

The reservoir 34 for thermoplastic coating material is heated by electric heaters 35 which are substantially the same as heaters 71. Reservoir 30 is heated by electric heater 71, as shown in FIGS. 4 to 6. Coating roller 22 is heated by electric heater 78 as previously described. This arrangement of heaters causes the hot melt thermoplastic coating material to be maintained fluid at all points in the apparatus up to the point of application to the corrugated cardboard or other flat stock being coated therein. The arrangement of ribs 64 and dressing gasket 72 and dressing spring 73 permits high speed operation of the coating wheel 22 without waste of the fluid thermoplastic coating material. This coating apparatus has been operated at extremely high speeds with no splashing of the molten thermoplastic coating material or loss of the coating material by centrifugal force from the coating roller.

During operation of this apparatus when a sheet of corrugated cardboard or other flat stock is fed between coating roller 22 and press roller 23, the thickness of the coating applied to the stock is determined by the extent of pressure exerted by press roller 23 and also by the positioning of spring 73 and gasket 72 for dressing the coating roller 22. The coarse knurled surface of coating roller 22 is operable to apply a substantial thickness of thermoplastic coating material to the stock being processed. The control of the thickness of the coating applied to the stock is largely accomplished by vertical adjustment of press roller 23 by adjusting screws 25, seen in FIG. 1. In FIG. 6, the stock to be printed is illustrated diagrammatically as sheet material 85 being fed from right to left through the apparatus.

Operation

The operation of this apparatus should be obvious from the decription of the assembly and function of the component parts. Nevertheless, a summary of the operation may assist one in a more thorough understanding of the invention.

When the apparatus is to be operated, electric motor 13 is energized driving coating roller 22 and press roller 23. At the same time, electric motor 48 is driving conveyor belts 46 in the conveyor portion of the apparatus. The several fans 59 are also energized by their respective motors 58.

The press roller 23 is adjusted to a selected height in relation to coating roller 22 to provide the desired coating on stock 85 to be fed through the apparatus. The dressing spring 73 and gasket 72 may also be adjusted if desired to assist in determining the amount of coating applied. The electric heaters 35, 36, and 71 are energized to maintain the coating material fluid throughout the system. It should be noted that the electric ciricuits and switches for the heaters and for controlling the electric motors are simple rheostatic switches. The coating material which is used with this apparatus is preferably a hot melt material of the thermoplastic type which adheres tenaciously to the surface layer of corrugated cardboard or other sheet stock being processed. A preferred coating material used in this apparatus is a hot metal polyethylene or a hot melt adhesive such as Union Paste No. H90 hot melt adhesive manufactured by Union Paste Company. Any hot melt thermoplastic coating material may be used in this apparatus. It is also possible to use lacquer-type coating materials provided that the solvent for the laquer is sufficiently volatile to be removed by the fans 59. It is preferred not to use lacquer-type coating, however, due to the fire hazard which results from the evaporation of the solvent from the lacquer.

When press roller 23 is adjusted to the desired position and the dressing spring and gasket for coating roller 22 are adjusted as desired, the corrugated cardboard is fed into the apparatus. The rotation of rollers 22 and 23 act to feed the board 85 through the apparatus and to provide a coating of desired thickness on the lower surface of the cardboard. As the cardboard is ejected from the coating roller to the right as seen in FIG. 1, it is supported on the upwardly directed blasts of air from fans 59. The upwardly directed air blasts from fans 59 are operable to support the coated cardboard in the conveyor section of the apparatus. The air blasts from fans 59 are sufficient to support the cardboard pressed against the underside of conveyor belts 46 and conveyed along to the right, as viewed in FIG. 1, by the conveyor belts. The air blasts from fans 59 not only support the coated cardboard in the conveyor section with the coated surface positioned downward away from contact with the conveyor belts, but also function to harden or dry the coating on the cardboard. When the cardboard is ejected from the conveyor section to the right of FIG. 1, the thermoplastic coating is sufficiently hard or dry and is essentially non-tacky.

While the apparatus is complete, as shown, it may prove desirable to have moving belt or other suitable conveyor means positioned at the ejection end of the conveyor portion of the apparatus to convey the coated cardboard to a point of storage or to a point of further processing. If desired, the coated board may pass through a suitable conveyor arrangement to turn the board over in preparation for passing through another coating apparatus for applying a thermoplastic waterproof coating to the other side of of the cardboard. The several novel features which have been combined in this coating apparatus have resulted in the production of a high speed coating machine which has handled corrugated cardboard in widths up to sixty inches (wider sheets of cardboard can be processed on larger machines) at linear speeds up to 500 feet per minute.

We claim:
1. An apparatus for applying a fluid plastic coating to corrugated cardboard, or the like, fed therethrough which comprises,
 a reservoir for said plastic coating material,
 heating means for said reservoir, a coating roller positioned in said reservoir and rotatable to apply a plastic coating to the underside of corrugated cardboard, or the like, passed in contact therewith, a press roller positioned over said coating roller and rotatable in conjunction therewith to feed corrugated cardboard and press the same against said coating roller to predetermine the amount of plastic coating applied, heating means for said coating roller to maintain the plastic coating fluid up to the point of application to said corrugated cardboard, and conveyor means removing the coated corrugated cardboard from the coating roller and contacting only the upper uncoated side of said carboard to suspend said cardboard with the coated surface out of contact with any part of the apparatus while the coating is hardening.

2. An apparatus as defined in claim 1 in which said first named and second named heating means are electric heaters.

3. An apparatus as defined in claim 1 in which said coating roller has a coarse knurled coating surface.

4. An apparatus as defined in claim 1 in which said reservoir is provided with a slotted cover through which said coating roller extends and temperature resistant plastic gasket fitting against said coating roller to prevent loss of plastic coating material during high speed rotation of the coating roller.

5. An apparatus as defined in claim 1 in which said reservoir is provided with a plurality of internal ribs between which said coating roller rotates and which prevents splashing of molten thermoplastic coating material during high speed rotation of the coating roller.

6. An apparatus as defined in claim 1 in which said reservoir is provided with a plurality of internal ribs between which said coating roller rotates, and is provided with a slotted cover through which said coating roller extends, and temperature resistant plastic gaskets fitting against the coating roller, said gasket and said ribs preventing loss of thermoplastic coating material during high speed rotation of said coating roller.

7. An apparatus as defined in claim 1 in which said conveyor includes means for directing high velocity air against the coated surface of said corrugated cardboard to harden the coating thereon while the coated corrugated cardboard is being removed from the apparatus.

8. An apparatus as defined in claim 1 in which said conveyor means comprises a plurality of horizontally disposed conveyor belts and means for directing high velocity air vertically toward said conveyor belts having velocity sufficient to support the coated cardboard against the underside of said conveyor belts, said conveyor belts moving said cardboard away from the coating roller while suspended by said high velocity air, and said high velocity air being operable to harden the coating on said cardboard while passing along the length of said conveyor.

9. An apparatus as defined in claim 8 in which said high velocity air directing means comprises a plurality of fans vertically positioned in spaced relation beneath said conveyor belts and supplying air at a velocity sufficient to support the coated cardboard against the underside of the conveyor belts and to harden the plastic coating thereon.

10. An apparatus as defined in claim 8 in which said first and second named heating means are electric heaters, said coating roller has a coarse knurled peripheral surface, said reservoir is provided with a plurality of internal ribs between which said coating roller rotates, and is provided with a slotted cover through which said coating roller extends, and temperature resistant plastic gaskets fitting against said coating roller, said gasket and said ribs preventing loss of adhesive during high speed rotation of said coating roller.

11. An apparatus as defined in claim 8 in which said press roller is vertically adjustable to vary its position in relation to said coating roller and thereby adjust the amount of coating material applied to the corrugated cardboard being processed.

References Cited
UNITED STATES PATENTS

| | | | |
|---|---|---|---|
| 2,659,340 | 11/1953 | Zinn | 118—202 |
| 2,952,078 | 9/1960 | Litzler | 34—156 XR |

WALTER A. SCHEEL, Primary Examiner

ROBERT I. SMITH, Assistant Examiner

U.S. Cl. X.R.

34—156, 162